(12) United States Patent
Moon

(10) Patent No.: US 8,539,305 B2
(45) Date of Patent: Sep. 17, 2013

(54) SEMICONDUCTOR APPARATUS AND DATA PROCESSING METHOD

(75) Inventor: Jin Yeong Moon, Ichon-shi (KR)

(73) Assignee: SK Hynix Inc., Gyeonggi-do (KR)

( * ) Notice: Subject to any disclaimer, the term of this patent is extended or adjusted under 35 U.S.C. 154(b) by 210 days.

(21) Appl. No.: 13/099,395

(22) Filed: May 3, 2011

(65) Prior Publication Data

US 2012/0221927 A1   Aug. 30, 2012

(30) Foreign Application Priority Data

Feb. 28, 2011   (KR) .................. 10-2011-0018196

(51) Int. Cl.
*H03M 13/09* (2006.01)
*H03M 13/33* (2006.01)

(52) U.S. Cl.
USPC .......................... 714/758; 714/764

(58) Field of Classification Search
None
See application file for complete search history.

(56) References Cited

U.S. PATENT DOCUMENTS

| 7,844,888 B2 * | 11/2010 | Nygren et al. | 714/805 |
| 8,407,558 B2 * | 3/2013 | Abbasfar | 714/755 |
| 2009/0322770 A1 * | 12/2009 | Bae | 345/522 |

FOREIGN PATENT DOCUMENTS

| JP | 61233500 A | * 10/1986 |
| KR | 1020090006642 A | 1/2009 |
| KR | 1020090023794 A | 3/2009 |
| KR | 1020100008849 A | 1/2010 |
| KR | 1020100074823 A | 7/2010 |

OTHER PUBLICATIONS

Shin et al., Reduction of bus transitions with partial bus-invert coding, Apr. 1998, Electronics Letters, vol. 34, Issue: 7, pp. 642-643.*
Yoon, S. et al., "A Fast GDDR5 Read CRC Calculation Circuit with Read DBI Operation", IEEE Asian Solid-Sate Circuits Conference, Nov. 2008, pp. 249-252.
Bae, Seung-Jun et al., "An 80 nm 4 Gb/s/pin 32 bit 512 Mb GDDR4 Graphics DRAM With Low Power and Low Noise Data Bus Inversion", IEEE Journal of Solid-State Circuits, vol. 43, Jan. 2008, pp. 121-131.
Lin K. et al., "A Low-cost Realization of Multiple-Input Exclusive-OR Gates", ASIC Conference and Exhibit, Proceedings of the Eighth Annual IEEE International, Sep. 1995, pp. 307-310.
Wang J. et al., "New Efficient Designs for XOR and XNOR Functions on the Transistor Level", IEEE Journal of Solid-state Circuits, vol. 29, No. 7, Jul. 1994, pp. 780-786.
Bui H. et al., "Design and Analysis of Low-Power 10-Transistor Full Adders Using Novel XOR-XNOR Gates", IEEE Transactions on Circuits and Systems II, vol. 49, No. 1, Jan. 2002, pp. 25-30.
Bui H. et al., "New 4-Transistor XOR and XNOR Designs", Proc. 2nd IEEE Asia Pacific Conf. ASICs, Aug. 2000, pp. 25-28.

* cited by examiner

*Primary Examiner* — Ajay Bhatia
*Assistant Examiner* — Dipakkumar Gandhi
(74) *Attorney, Agent, or Firm* — William Park & Associates Patent Ltd.

(57) ABSTRACT

A semiconductor apparatus includes a bus inversion information (DBI) processing unit configured to, when receiving multi-bit data, calculating DBI information of the data, and outputting a plurality of DBI flag signals, generate the plurality of DBI flag signals such that each DBI flag signal reflects DBI information of predetermined bits of the data, a first CRC processing unit configured to calculate cyclic redundancy check (CRC) information using the multi-bit data and partial DBI flag signals calculated among the plurality of DBI flag signals and output a plurality of CRC signals, and a second CRC processing unit configured to output CRC codes using the plurality of CRC signals and remaining DBI flag signals calculated among the plurality of the DBI flag signals.

11 Claims, 2 Drawing Sheets

SEMICONDUCTOR APPARATUS AND DATA PROCESSING METHOD

CROSS-REFERENCE TO RELATED APPLICATION

The present application claims priority under 35 U.S.C. §119(a) to Korean Application No. 10-2011-0018196, filed on Feb. 28, 2011, in the Korean Intellectual Property Office, which is incorporated herein by reference in its entirety as if set forth in full.

BACKGROUND

1. Technical Field

Various embodiments of the present invention relate to a semiconductor apparatus and related methods. In particular, certain embodiments relate to a signal processing technology of outputting reliable data fast.

2. Related Art

In a semiconductor apparatus, when a plurality of pieces of data output through pads PADs is simultaneously modified, that is, when the amount of data modified from a high level to a low level or from a low level to a high level is large, current consumption is increased, resulting in occurrence of noise.

In this regard, a data bus inversion (DBI) technology may be used to reduce the number of data to be modified. For example, assuming that an initial level of data is a high level, when 8-bit data is output, it is determined whether the number of data to be modified to a low level exceeds 4. If the number of data to be modified to the low level exceeds 4, the levels of all pieces of data are inverted. As a consequence, in the case of using the DBI technology, when outputting 8-bit data through pads PADs, the number of data modified from the high level to the low level does not exceed 4.

Meanwhile, it is possible to improve the reliability of transmitted data using a cyclic redundancy check (CRC) technology. In the CRC technology, while data is transmitted, a check value for checking whether an error has occurred in the data in transmission is additionally transmitted. That is, before transmitting data, a CRC value of the data to be transmitted is calculated, and the data and the CRC value are transmitted together. At this time, the data and the CRC value may be simultaneously transmitted, sequentially transmitted, or the CRC value may be included in a data packet for transmission. Then, a data reception side may determine whether the transmitted data is intact based on the received data and the CRC value.

In the case of simultaneously applying the DBI technology and the CRC technology, the calculation of DBI is completed first, and then the CRC value is calculated using data to which the DBI has been applied. At this time, since a substantial amount of time for DBI and CRC calculation is required, data output time is delayed when continuously outputting data.

SUMMARY

Accordingly, there is a need for an improved semiconductor apparatus capable of reducing DBI and CRC processing time. Also there is a need for an improved data processing method capable of reducing DBI and CRC processing time.

To attain the advantages and in accordance with the purposes of the invention, as embodied and broadly described herein, one exemplary aspect of the present invention may provide a semiconductor apparatus which includes: a bus inversion information (DBI) processing unit configured to, when receiving mufti-bit data, calculating DBI information of the data, and outputting a plurality of DBI flag signals, generate the plurality of DBI flag signals such that each DBI flag signal reflects DBI information of predetermined bits of the data; a first CRC processing unit configured to calculate cyclic redundancy check (CRC) information using the multi-bit data and partial DBI flag signals calculated among the plurality of DBI flag signals and output a plurality of CRC signals; and a second CRC processing unit configured to output CRC codes using the plurality of CRC signals and remaining DBI flag signals calculated among the plurality of the DBI flag signals.

In another exemplary aspect of the present invention, a data processing method may include: receiving mufti-bit data, calculating DBI information of the data, and outputting a plurality of DBI flag signals; calculating CRC information using the multi-bit data and partial DBI flag signals calculated among the plurality of DBI flag signals and outputting a plurality of CRC signals; and outputting CRC codes using the plurality of CRC signals and remaining DBI flag signals calculated among the plurality of the DBI flag signals.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments consistent with the invention and, together with the description, serve to explain the principles of the invention.

DETAILED DESCRIPTION

Figure 1:
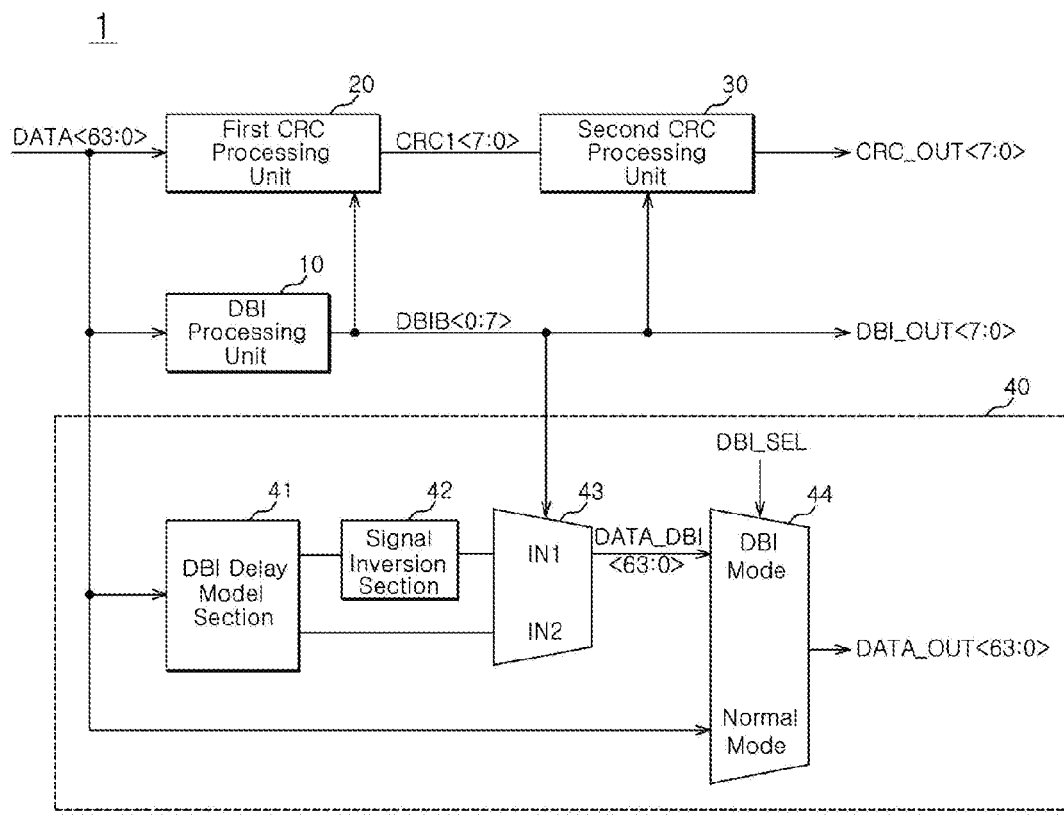
FIG. 1 is a configuration diagram of a semiconductor apparatus according to according to one embodiment.

Reference will now be made in detail to the exemplary embodiments consistent with the present disclosure, examples of which are illustrated in the accompanying drawings. Wherever possible, the same reference characters will be used throughout the drawings to refer to the same or like parts.

FIG. 1 is a configuration diagram of a semiconductor apparatus according to one embodiment of the present invention.

The semiconductor apparatus according to the present embodiment includes a simplified structure to clearly explain the technical spirit intended to be proposed herein.

Referring to FIG. 1, the semiconductor apparatus may include a DBI processing unit 10, a first CRC processing unit 20, a second CRC processing unit 30, and a data processing unit 40.

Hereinafter, the detailed structure and operations of the semiconductor apparatus configured as above will be described.

The DBI processing unit 10 is configured to calculate DBI information of multi-bit data DATA<63:0> and output a plurality of DBI flag signals DBIB<0:7>. The DBI processing unit 10 is configured to generate the plurality of DBI flag signals DBIB<0:7> such that they reflect DBI information of predetermined bits of the data DATA<63:0>.

In the present embodiment, the DBI processing unit 10 is configured to determine the majority of values of the predetermined bits of the data DATA<63:0> and decide the level of each DBI flag signal based on the determination result. For example, assuming that the majority of each 8-bit data of the total 64-bit data DATA<63:0> is determined, if the number of low levels in the bit values of a first data group DATA<0:7> exceeds 4, a first DBI flag signal DBIB<0> is activated to a low level. However, if the number of low levels in the bit values of the first data group DATA<0:7> is equal to or less than 4, the first DBI flag signal DBIB<0> is deactivated to a high level. Here, the data groups may be defined as an 8-bit data set which corresponds to the same burst slot. In the embodiment, it is assumed that the initial value of the data DATA<63:0> is a high level. That is, the data DATA<63:0> is terminated to a high level. Since the majority of each 8-bit data of the 64-bit data DATA<63:0> is determined and the level of each DBI flag signal is decided, DBI flag signals DBIB<0:7> of the total 8 bits are generated.

The first CRC processing unit 20 is configured to calculate CRC information using the mufti-bit data DATA<63:0> and partial DBI flag signals calculated among the DBI flag signals DBIB<0:7>, and output a plurality of CRC signals CRC1<7:0>.

In the embodiment, the first CRC processing unit 20 is configured to perform an XOR operation on the mufti-bit data DATA<63:0> and the partial DBI flag signals which have been calculated and generate the plurality of CRC signals CRC1<7:0>. Although not shown in the drawing, the first CRC processing unit 20 may include a plurality of XOR sections.

The second CRC processing unit 30 is configured to output CRC codes CRC_OUT<7:0> using the plurality of CRC signals CRC1<7:0> and remaining DBI flag signals of the DBI flag signals DBIB<0:7>, that is, remaining DBI flag signals except for the partial DBI flag signals used in the first CRC processing unit 20.

In the embodiment, the second CRC processing unit 30 is configured to perform an XOR operation on the plurality of CRC signals CRC1<7:0> and the remaining DBI flag signals and generate the CRC codes CRC_OUT<7:0>. Although not shown in the drawing, the second CRC processing unit 30 may include a plurality of XOR sections.

The data processing unit 40 is configured to selectively invert the multi-bit data DATA<63:0> in response to a DBI enable signal DBI_SEL and the DBI flag signals DBIB<0:7> and output inverted data as output data DATA_OUT<63:0>.

In the embodiment, the data processing unit 40 may include a DBI delay model section 41, a signal inversion section 42, a first selection section 43, and a second selection section 44.

The DBI delay model section 41 is configured to delay the multi-bit data DATA<63:0> by the time period necessary for the DBI processing unit 10 to calculate the DBI information, and output delayed data. That is, the DBI delay model section 41 is provided to adjust the output timing of data.

The signal inversion section 42 is configured to invert and output a signal output from the DBI delay model section 41.

The first selection section 43 is configured to selectively output one of the output signal of the DBI delay model section 41 and the output signal of the signal inversion section 42 in response to the DBI flag signals DBIB<0:7>.

The second selection section 44 is configured to selectively output one of the mufti-bit data DATA<63:0> and the output signals DATA_DBI<63:0> of the first selection section 43 as the output data DATA_OUT<63:0> in response to the DBI enable signal DBI_SEL. The DBI enable signal DBI_SEL is used to activate a DBI operation. When the DBI enable signal DBI_SEL is activated, the second selection section 44 outputs the output data DATA_OUT<63:0> to which the DBI operation has been performed. However, when the DBI enable signal DBI_SEL is deactivated, the second selection section 44 directly outputs the data DATA<63:0> as the output data DATA_OUT<63:0>.

The DBI processing unit 10 and the first CRC processing unit 20 may include a plurality of XOR sections, respectively. Here, since the first CRC processing unit 20 includes many XOR stages relative to the DBI processing unit 10, it may be possible to reduce a circuit occupation area by commonly using idle XOR sections of the DBI processing unit 10 and the first CRC processing unit 20 as the occasion demands. That is, while a digital circuit for processing a multi-bit input signal is mainly prepared in the form of $2^n$ trees, the bit number of an input signal applied to the first CRC processing unit 20 is not exactly $2^n$ in most cases. Therefore, idle XOR tree portions of the first CRC processing unit 20 may also be used for DBI calculation. At this time, since CRC calculation time is different from DBI calculation time, a tree position may be selected such that no change occurs in the final CRC calculation time.

When the idle XOR tree portions of the first CRC processing unit 20 are used for the DBI calculation, if it is assumed that a penalty may be given to the CRC calculation time, many more XOR trees of the first CRC processing unit 20 may be used for the DBI calculation. In such a case, a calculation part performed by the second CRC processing unit 30 may be performed through the XOR tree portions of the first CRC processing unit 20.

Figure 2:
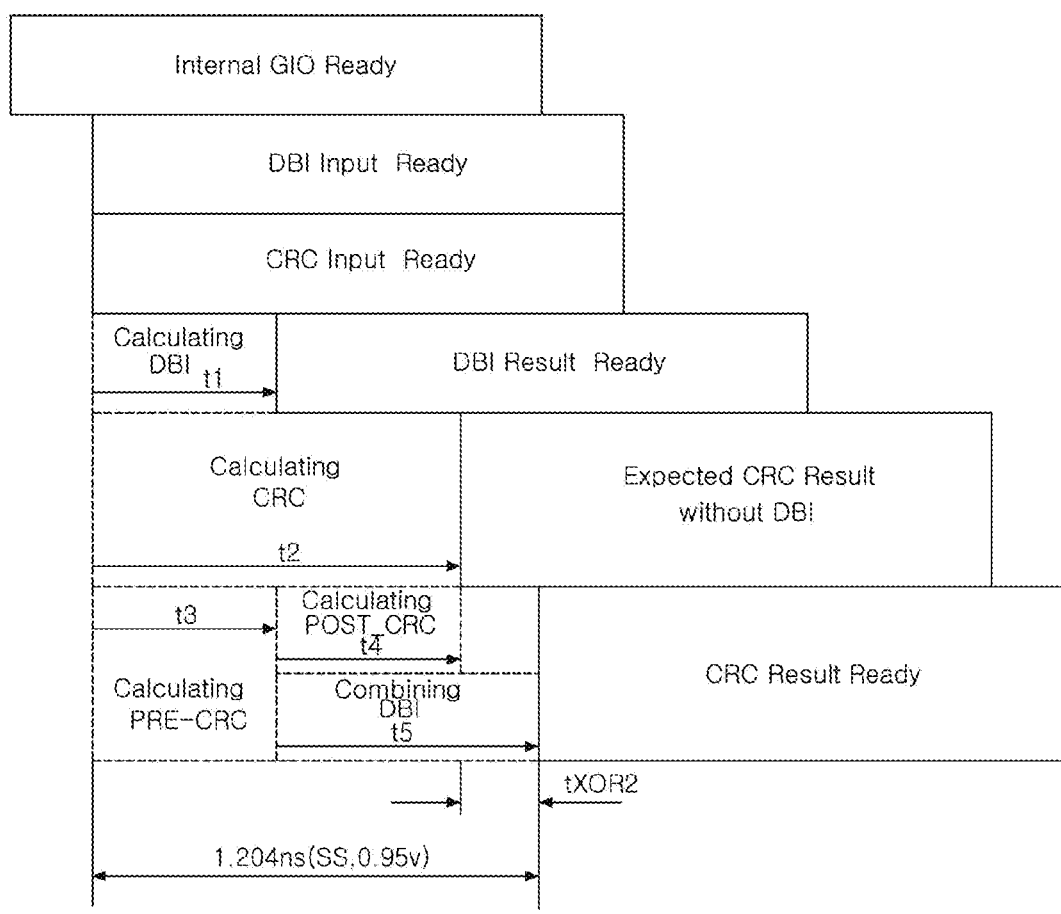
FIG. 2 is a diagram illustrating a data processing method using the semiconductor apparatus illustrated in FIG. 1.

FIG. 2 is a diagram illustrating a data processing method using the semiconductor apparatus illustrated in FIG. 1.

The data processing method of the semiconductor apparatus according to the embodiment will be described with reference to FIG. 2 below.

The data processing method may include: calculating DBI information of mufti-bit data to output a plurality of DBI flag signals, calculating CRC information using the mufti-bit data and partial DBI flag signals calculated among the plurality of DBI flag signals to output a plurality of CRC signals, and outputting CRC codes using the plurality of CRC signals and remaining DBI flag signals calculated among the plurality of the DBI flag signals.

In a conventional data processing method in which the DBI information is calculated, data is inverted through the DBI information, and then CRC information is calculated, and thus a substantial amount of data processing time is required.

In this regard, the embodiment proposes a data processing method for simultaneously processing the DBI information and the CRC information in a parallel manner. That is, since the time for calculating CRC information of mufti-bit data is larger than the time for calculating DBI information of multi-bit data, the CRC information of the data is first calculated using only partial DBI information which have been calculated. Then, the CRC information of the data is corrected using remaining DBI information having been calculated, and final CRC codes are output.

As described above, it is possible to reduce data processing time by simultaneously applying the DBI technology and the CRC technology through the proposed semiconductor apparatus and data processing method. In addition, it may be possible to reduce a circuit occupation area by commonly using idle XOR sections of the DBI processing unit 10 and the first CRC processing unit 20 as the occasion demands.

While certain embodiments have been described above, it will be understood to those skilled in the art that the embodiments described are by way of example only. Accordingly, the semiconductor apparatus and the data processing method described herein should not be limited based on the described embodiments. Rather, the semiconductor apparatus and the data processing method described herein should only be limited in light of the claims that follow when taken in conjunction with the above description and accompanying drawings.

What is claimed is:

1. A semiconductor apparatus comprising:
    a bus inversion information (DBI) processing unit configured to, when receiving mufti-bit data, calculating DBI information of the data, and outputting a plurality of DBI flag signals, generate the plurality of DBI flag signals such that each DBI flag signal reflects DBI information of predetermined bits of the data;
    a first CRC processing unit configured to calculate cyclic redundancy check (CRC) information using the multi-bit data and partial DBI flag signals calculated among the plurality of DBI flag signals and output a plurality of CRC signals; and
    a second CRC processing unit configured to output CRC codes using the plurality of CRC signals and remaining DBI flag signals calculated among the plurality of the DBI flag signals.

2. The semiconductor apparatus according to claim 1, further comprising:
    a data processing unit configured to selectively invert the multi-bit data in response to a DBI enable signal and the plurality of the DBI flag signals, and output inverted data as output data.

3. The semiconductor apparatus according to claim 2, wherein the data processing unit comprises:
    a DBI delay model section configured to delay the mufti-bit data by a time period necessary for the DBI processing unit to calculate the DBI information, and output delayed data;
    a signal inversion section configured to invert and output a signal output from the DBI delay model section;
    a first selection section configured to selectively output one of an output signal of the DBI delay model section and an output signal of the signal inversion section in response to the plurality of DBI flag signals; and
    a second selection section configured to selectively output one of the mufti-bit data and an output signal of the first selection section in response to the DBI enable signal.

4. The semiconductor apparatus according to claim 1, wherein the DBI processing unit is configured to determine majority of values of predetermined bits of the data and decide a level of each DBI flag signal based on a determination result.

5. The semiconductor apparatus according to claim 1, wherein the first CRC processing unit is configured to perform an XOR operation on the mufti-bit data and the partial DBI flag signals and generate the plurality of CRC signals.

6. The semiconductor apparatus according to claim 1, wherein the second CRC processing unit is configured to perform an XOR operation on the plurality of CRC signals and the remaining DBI flag signals and generate the plurality of CRC codes.

7. A data processing method comprising:
    receiving mufti-bit data, calculating DBI information of the data, and outputting a plurality of DBI flag signals;
    calculating CRC information using the mufti-bit data and partial DBI flag signals calculated among the plurality of DBI flag signals and outputting a plurality of CRC signals; and
    outputting CRC codes using the plurality of CRC signals and remaining DBI flag signals calculated among the plurality of the DBI flag signals.

8. The data processing method according to claim 7, further comprising a step of:
    selectively inverting the mufti-bit data in response to the plurality of the DBI flag signals and outputting inverted data as output data.

9. The data processing method according to claim 7, wherein, when outputting the plurality of DBI flag signals, majority of values of predetermined bits of the data is determined and a level of each DBI flag signal is decided based on a determination result.

10. The data processing method according to claim 7, wherein, when outputting the plurality of CRC signals, an XOR operation is performed on the mufti-bit data and the partial DBI flag signals to generate the plurality of CRC signals.

11. The data processing method according to claim 7, wherein, when outputting the CRC codes, an XOR operation is performed on the plurality of CRC signals and the remaining DBI flag signals to generate the plurality of CRC codes.

* * * * *